No. 654,594. Patented July 31, 1900.
H. L. BENJAMIN.
CHURN DASHER.
(Application filed June 2, 1900.)
(No Model.)
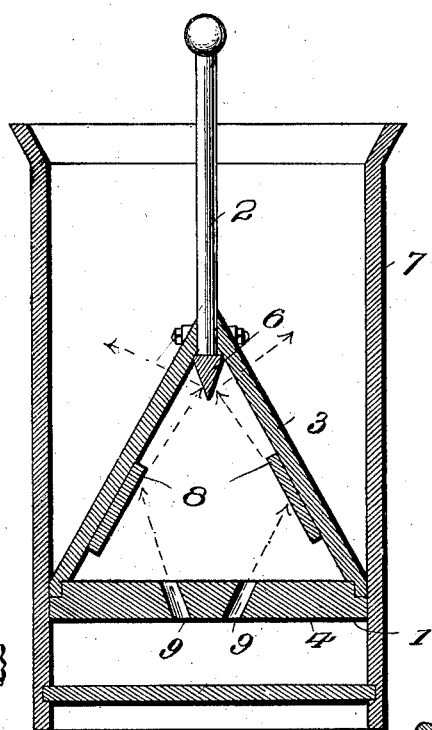
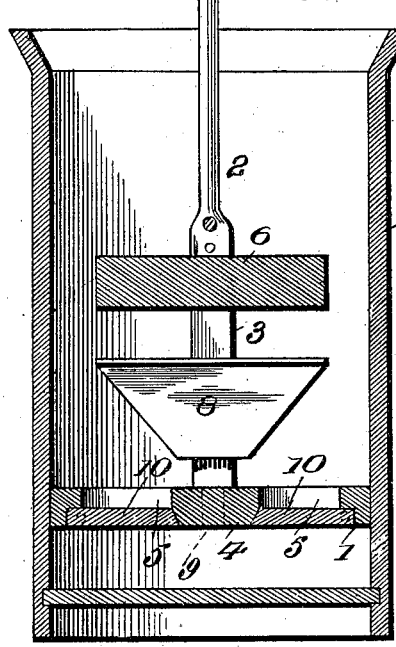
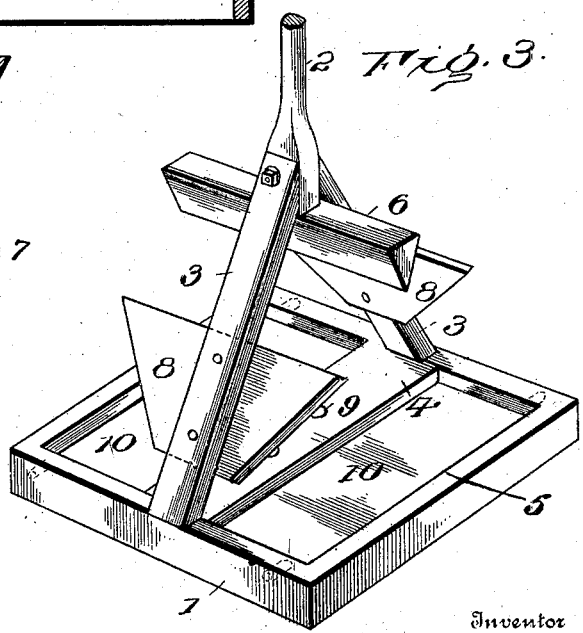
Inventor
H. L. Benjamin

UNITED STATES PATENT OFFICE.

HIRAM L. BENJAMIN, OF REYNOLDS, NEBRASKA, ASSIGNOR OF ONE-HALF TO W. C. PARKER, OF SAME PLACE.

CHURN-DASHER.

SPECIFICATION forming part of Letters Patent No. 654,594, dated July 31, 1900.

Application filed June 2, 1900. Serial No. 18,889. (No model.)

*To all whom it may concern:*

Be it known that I, HIRAM L. BENJAMIN, a citizen of the United States, residing at Reynolds, in the county of Jefferson and State of Nebraska, have invented certain new and useful Improvements in Churn-Dashers; and I do hereby declare the following to be a full, clear, and exact description of the invention, such as will enable others skilled in the art to which it appertains to make and use the same.

This invention relates to a dasher for churns and use in connection with receptacles containing a liquid to be violently agitated by reciprocating a beater vertically therein. While the dasher is best adapted for churning cream in the process of making butter, it can be used for a variety of purposes when it is required to beat or whip batters, liquids, and the like.

For a full description of the invention and the merits thereof, and also to acquire a knowledge of the details of construction of the means for effecting the result, reference is to be had to the appended description and drawings hereto attached.

While the essential and characteristic features of the invention are necessarily susceptible of modification, still the preferred embodiment of the invention is illustrated in the accompanying drawings, in which—

Figure 1 is a vertical central section of a dasher constructed in accordance with this invention, showing it in connection with a receptacle and the arrows indicating the currents when the dasher is passed downward. Fig. 2 is a view similar to Fig. 1, taken at a right angle thereto. Fig. 3 is a perspective view of the dasher.

Corresponding and like parts are referred to in the following description and indicated in all the views of the drawings by the same reference characters.

The dasher comprises a frame 1 of rectangular formation, a staff or rod 2, and upwardly-convergent braces 3, connecting the frame with the lower end of the staff. A bar 4 is disposed medially of opposite side bars of the frame and is located in the plane of the braces 3 and subdivides said frame, so as to form opposite openings or spaces 5, through which the cream or liquid moves rapidly when the dasher is raised after being pressed downward into a receptacle containing the liquid to be agitated. A deflector 6 is disposed at a right angle to the bar 4 and is of wedge shape in transverse section and is secured in the angle formed between the upper ends of the braces 3 and projects an equal distance upon opposite sides of the plane thereof. The deflector 6 extends horizontally, and its sides are upwardly divergent, so as to direct the currents impinging against the sides thereof outwardly against the sides of the receptacle 7, as indicated most clearly by the arrows in Fig. 1.

Plates 8 are attached midway of their ends to the braces 3 and incline inwardly and upwardly in conformity to the inclination of the braces. These plates 8 act as deflectors to change the direction of the currents of the liquid when the dasher descends through the body of the liquid to be agitated. The plates 8 are of wedge form and their edges are upwardly divergent, whereby the upper ends of the plates are broad and the lower ends narrow, whereby the cream is spread as well as deflected.

Upwardly-divergent openings 9 are formed in the bar 4 and constitute passages for the liquid when the dasher is in operation, the jets passing upwardly through the openings, striking the deflectors 8, and from thence against the sides of the deflector 6, as indicated most clearly by the arrows in Fig. 1. Wings 10 close the openings 5 at the sides of the bar 4 and are pivoted in line with their outer edges, so as to swing open at their inner edges. The swing edges of the wings are beveled to rest against the beveled portions of the bar 4, so as to prevent upward displacement of the wings and maintain them in closed position when the dasher is pressed down through the body of liquid. These wings 10 are adapted to swing open in a downward direction at their inner edges when moving the dasher upward through the cream or other substance to be churned. Upon depressing the dasher the wings close, thereby compelling the liquid to pass through the openings 9 with great force and against the deflectors 8 and 6, as indicated by the arrows in Fig. 1. As the dasher rises, the wings 10 open and permit the liquid or cream that may be above the dasher to pass below it. In this connection it is to be noted that the dasher has a snug fit in the receptacle, and this is essential to the successful operation of the device.

The parts comprising the dasher are readily accessible for a thorough cleaning, inspection, and repairs, and the deflecting-surfaces are so arranged that a violent agitation of the cream or liquid to be churned is produced when the dasher is in operation. Hence the process of churning is greatly facilitated and hastened.

Having thus described the invention, what is claimed as new is—

1. A dasher comprising a base portion having upwardly-divergent openings, upwardly-convergent plates disposed opposite the said divergent openings, and a deflector located in a higher plane than the said plates and having its sides upwardly divergent, substantially as set forth.

2. A dasher comprising a base portion having intermediate and side openings, pivoted wings for closing the side openings and adapted to swing downward at their inner edges, upwardly-convergent plates arranged at a right angle to the pivoted wings, and a deflector located in a higher plane than the convergent wings and parallel therewith and having its sides upwardly divergent, substantially as specified.

In testimony whereof I affix my signature in presence of two witnesses.

HIRAM L. BENJAMIN. [L. S.]

Witnesses:
W. C. PARKER,
LEORA BENJAMIN.